United States Patent [19]
Ziemek et al.

[11] 3,791,416
[45] Feb. 12, 1974

[54] SPACER ASSEMBLY FOR CONCENTRIC TUBULAR SYSTEMS

[75] Inventors: Gerhard Ziemek, Hannover; August Beck, Langenhagen; Ewald Gunia, Hannover; Friedrich Schatz, Langenhagen; Hans-Joachim Arntz, Berenbostel, all of Germany

[73] Assignee: Kabel- und Metallwerke Gutehoffnungshutte Aktiengesellschaft, Hannover, Germany

[22] Filed: June 8, 1972

[21] Appl. No.: 261,047

[30] Foreign Application Priority Data
June 15, 1971 Germany............................. 2129556
July 20, 1971 Germany............................. 2136176

[52] U.S. Cl. ............................... 138/112, 138/114
[51] Int. Cl. ............................................... F16l 7/00
[58] Field of Search ... 138/112, 114, 113; 174/99 R

[56] References Cited
UNITED STATES PATENTS
1,761,084   6/1930   Lissawer ............................. 138/113
3,110,324   11/1963   De Haan ......................... 138/114 X

*Primary Examiner*—Jerry W. Myracle
*Attorney, Agent, or Firm*—Smyth, Roston & Pavitt

[57] ABSTRACT

A spacer assembly for a concentric tube system having at least two tubes, to be placed in thermally insulative, concentric relation. An annular arrangement of ring elements with large and small gaps, bolted together and traversed by the inner one of the two tubes; the ring elements are preferably hinged together. A plurality of loops extend inwardly from the annular arrangement for suspending the inner tube in the annular arrangement from at least three different radial directions; the loops are established by thread, wire or ribbon.

13 Claims, 7 Drawing Figures

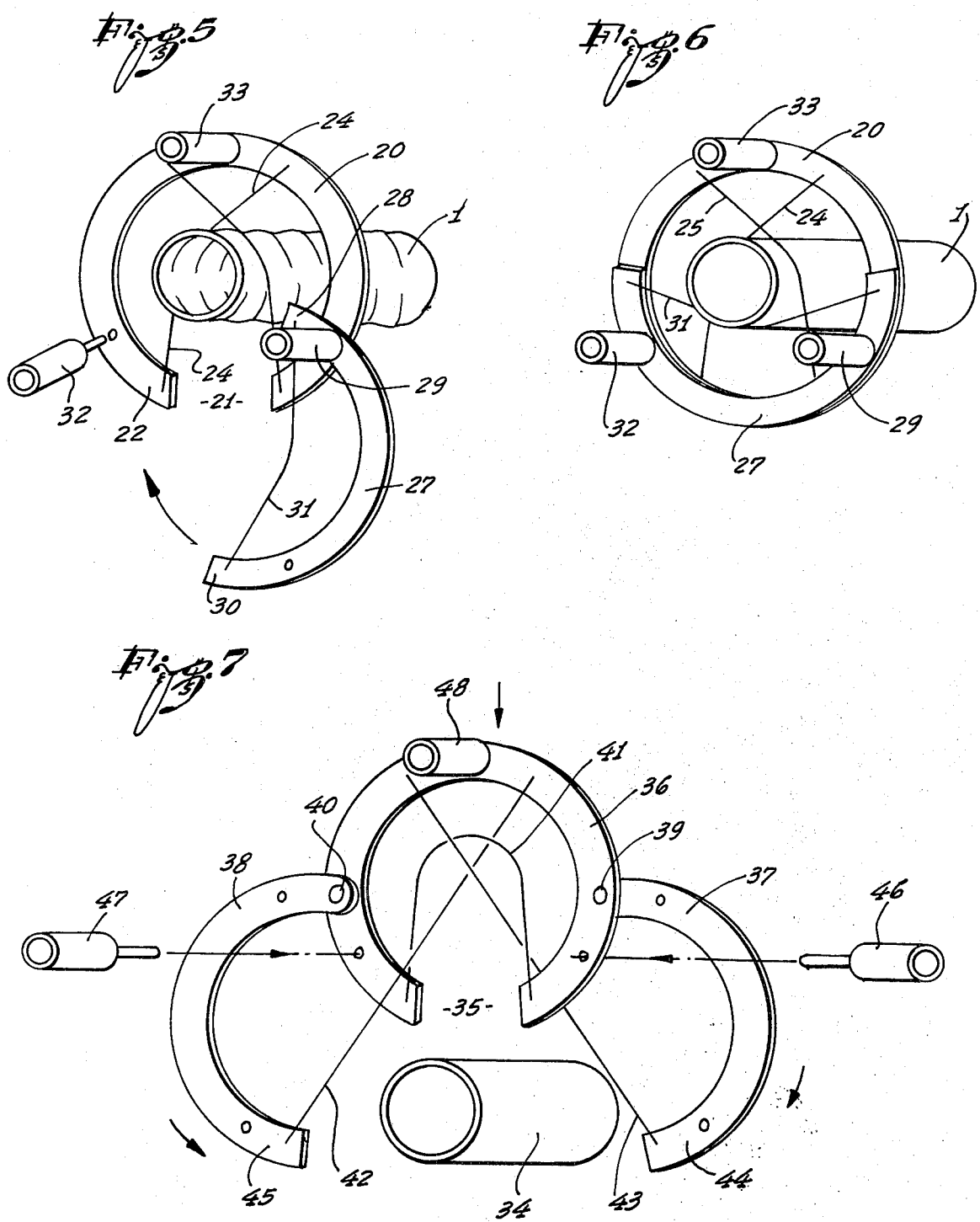

SPACER ASSEMBLY FOR CONCENTRIC TUBULAR SYSTEMS

BACKGROUND OF THE INVENTION

The present invention relates to a tubular system which includes two or more concentric tubes and to be used for cryogenic cables or as conduit for hot or cold fluid. At least some of the tubes of the system are preferably provided with annular or helical corrugation.

Cryogenic cables are known having conductors which run in tubes filled with liquid helium. The tube which contains these conductors is preferably enveloped by one or more cencentric tubes of larger diameter so that concentric space is established for purposes of thermal insulation. The space between the innermost tube of the system and the tube of next larger diameter may be evacuated. The space between the latter tube and the third one (as counted from the interior) may be filled with liquid nitrogen, so as to establish a controlled temperature gradient, and to thermally isolate the inner tube from the environment.

Other tubular systems are known, such as a system having four concentric tubes for purposes of conducting liquified gas such as helium or hydrogen.

All these tube systems require that an outer tube be supported on the next one in the interior. Spacers for this purpose are known in various varietions. For example, a helical spacer made of plastic may be seated on a tube and the tube of next larger diameter rests on the spacer. Other spacers include individual elements distributed in the annular-cylindrical space between two concentric tubes.

It is apparent that the spacers are an impediment for any liquid flow in the space between two tubes. The larger the spacer, the greater is the impediment. Utilization of the concentric space between two tubes as conduit for liquid is necessary if the medium in the innermost tube requires active heating or cooling. For example, tubular systems are used for conducting liquified sulfur. The sulfur must have a particular viscosity in order to flow properly through the tube. Therefor, the sulfur must be heated continuously along its path for maintaining the desired flow conditions therealong.

The conduction of liquid helium or hydrogen through long pipelines requires continuous cooling. The situation is particularly critical for cables operated in the supra-conductive state. Such a cable has usually four concentric tubes, and, counting again from the interior, liquid nitrogen passes in the space between the second and the third tube for thermally isolating the inner tube from the environment.

It is necessary in all these cases for a particular fluid to pass through the space between respective two coaxial tubes without impediment, as any flow restriction reduces the cooling or heating to be provided by that fluid. Spacers in that flow path, when impeding the flow, create pressure losses so that pumping stations must be provided along the flow path. Obviously, the greater the pressure loss per unit length of flow path, the more pumping stations are needed.

It can be seen that the flow impediments in the space between two concentric tubes can be reduced as to effectiveness only by utilization of construction that occupies very little space. Fourtunately, that requirement is in consonance with the requirement that the spacer construction should be as ineffective as possible, as a thermal conduction bridge between inner and outer tube. The decisive point now is that known spacers which are strong enough to support an inner tube in an outer one (whereby the outer tube may by itself be supported by other tubes in a multi tube system) and which have satisfactory thermally insulative properties, all offer significant flow resistance and are all quite effective impediments. Moreover, even in cases where the space between concentric tubes is not used as flow space but is, for example, evacuated, heavy inner tubing may rest on portions of the spacer in an outer tube, and tends to compress the spacer material. That, in turn, is instrumental in the generation of significant heat bridges between the tubes. If the spacer is too thin in load-bearing cross section or is otherwise too weak, it will collapse under heavy load conditions; if the spacer is wide in load-bearing cross section heat conduction becomes significant.

Therefor, the employment of known spacers becomes difficult for tubing that is or becomes heavy on passage of large amounts of liquid through large cross sections of flow.

DESCRIPTION OF THE INVENTION

It is an object of the invention to overcome the problem outlined above and to provide a tube system wherein the flot path restriction in the cylindrical-annular space between the two tubes is as low, or at least almost as low as if no barrier of any kind were present in that space. The invention is based on the concept that the outer one of two concentric tubes should not support the inner one through spacers that may tend to be compressed; rather, the inner tube should be concentrically suspended in the outer tube. Therefore, the spacers should be constructed in annular configuration including preferably several rings and/or ring segments as holders for thread, ribbon, wire or the like, forming loops for suspending the inner tube in three (or more) point suspensions for each such multi-ring unit, and the several units suspend the inner tube along the axial extension of the tube system.

The resulting flow losses here are quite small, practically negligible. Also, flexible material, when used for suspending the inner tube, does not establish any thermal conduction bridge to speak of. The suspending loops are only subject to tension and, therefore, the spacer holding the inner tube in the outer tube does not have to be stiff as load-bearing elements. Heat transfer through the suspension is negligible. The spacer function of the thin thread, ribbon or wire is fullfilled solely through tension acting on the thread or wire; the inner tube does not rest on spacers in the outer tube. The outer tube, of course, can also be suspended in still another tube etc. Thus, the amount of material involved in spanning the annular gap between the tubes, is much lower than needed, if the inner tube sits on the spacer.

For practicing the invention, it may be of advantage to use rings with gaps, having width at least as large as the outer diameter of the inner tube to be suspended. In addition, ring segments may be used. The ring elements, rings with gap and/or ring segments, are provided for individual lateral placement in concentric position to and around the inner tube and coaxially to each other. Upon being so placed, the ring elements are fastened to each other in order to obtain a unitary annular construction from which extend the loops in various (radial) directions for suspending the inner tube. The point of suspension, as far as tensioning the tube against each loop by operation of the other loops is concerned, should be symmetrical to the suspension of the loop and that, in turn, should result in regularly placed suspension points around the tube as suspended. Gravity modifies this arrangement and it is, therefor, advisable to operate with overlapping loops so that the effective suspension points are never outside of points of loop-tube engagement. This latter rule, however, can be relaxed, if the inner tube to be suspended is rather light.

The ring elements may be hingedly interconnected to permit partial pre-assembly and ready placement of each ring over the inner tube, with one ring element slipped onto the inner tube in concentric position thereto, and the other ring elements are then pivoted into corresponding coaxial position, whereby the several loops catch the inner tube and suspend same in the now completed annular spacer unit.

Upon choosing such a construction, the inner tube is actually suspended in and by the ring element assembly. This assembly of ring elements may but do not have to be affixed to the outer tube. The loops may be formed in various configurations as far as fastening to and suspension from the ring elements is concerned. In one configuration, the loop is formed between the ring ends adjacent the gap or loosely spans the ends of a ring segment.

The number of loops formed is not critical except that at least three loops for a three point suspension are being used. More could be used in case of very heavy construction. If the inner tube is corrugated, a corrugation groove readily serves as trough-like receiving bed for the looping wires or threads or ribbons.

The outer tube may actually be made in continuous process on top of the inner tube-spacer unit assembly, with spacer units provided on the inner tube, for example, regularly on the inner tube. Metal strip may be longitudinally bent around the inner tube-spacer units assembly, and adjoining edges of the bent strip are welded to close the outer tube.

The number of ring elements employed is not of immediate significance. There must be just enough holes for suspending the required or desired number of thread or wire loops. Also, the rings with gaps or segments should be placeable with ease around the tube to be suspended. The ring segments should be interconnected (bolted, etc.) to form a unit from which the tube is suspended.

A particularly advantageous construction has three rings with gaps, two or which are hinged at points close to the gaps and to a point of the third segment opposite its gap. Thus, this three-ring assembly has a common hinge axis, but the pivot points on each ring element are relatively displaced angularly, for example, by 120°. Upon installation, the two rings are folded up; the one with the center hinge point is slipped over the tube, and then the two others are folded into coaxial position to each other, and to the third one, whereupon the rings are bolted together and form, in effect, a ring with three suspension loops.

Due to the mode of hinging, the gaps are likewise angularly displaced so that the three rings when combined establish an annular ring structure without gap. The loops are formed here preferably by fastening the respective ends of pieces of thread, ribbon or wire to points on the ring adjacent the gap one loop per ring and gap. A 120° angular gap displacement in the completed annular assembly will necessarily result in a regular three-point suspension assembly for the inner tube when held in the loops, whereby the loops do overlap. The pivot action during assembly is instrumental in catching the inner tube in the loops of the two hingedly pivoted rings.

An alternate construction for a three-ring-element suspension unit has respective two-ring segments, hinged in separate hinge points to the legs of a ring with gap. This and the foregoing assembly is somewhat analogous to handcuffs but with two hinge elements on a third one, preferably in symmetrical configuration.

A still further alternative construction has a ring element with gap and two wires, or the like, are fastened for establishing two loops. The gap can be hingedly closed through a hinged ring segment across which extends a third wire, etc., for the third suspending loop. The resulting loops are rather shallow.

Plastic thread can readily be used, such as strands of nylon or polyester, because even thin thread of this kind of material has sufficient tensile strength; alternatively, metal thread or wire can be used.

As stated, a loop can be established by affixing the ends of a length of thread or wire so as to loosely span the gap. Alternatively, one of the loop ends may be affixed to a point on a ring segment remote from its hinge point of the segment, while the other end is affixed to a different ring element and/or to a point remote from the gap in the particular element.

Generally speaking, the loops should loop around the inner tube over a significant angle so that the several angularly displaced loops overlap as to engagement with the inner tube. This is accomplished by having the two points of suspension for a loop not too far apart along a circle around the ring center. However, if the inner tube is rather light, the loops may be shallow. In this case, the construction of one ring with gap plus one hinged segment as mentioned above is of advantage, because of structural simplicity. Two loops resulting from two wires, etc., respectively extending from ring portions adjacent the gap to points on the ring opposite the gap; the third wire, etc., extends between the end of the segment as stated. In this case, the points of fastening of each wire are quite far apart along the annulus as established by the ring plus segment structure.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a cross section of a tubular system in which a novel spacer unit suspends an inner tube in an outer tube;

FIG. 2 illustrates a single ring element to be used in a spacer unit;

FIG. 3 illustrates a three-ring-spacer unit, partially assembled, with common hinge axis and for placement onto and around a tube;

FIG. 4 illustrates the completed assembly of FIG. 3 in suspending position;

FIG. 5 illustrates a spacer, comprising one ring with gap and one hinged segment, partially assembled, and placed onto and around a tube;

FIG. 6 shows the completed assembly of FIG. 5 in tube suspending position; and

FIG. 7 shows a spacer unit with one ring-with-gap plug two hinged segments.

DESCRIPTION OF THE DRAWINGS

Proceeding now to the detailed description of the drawings.

Figure 1:
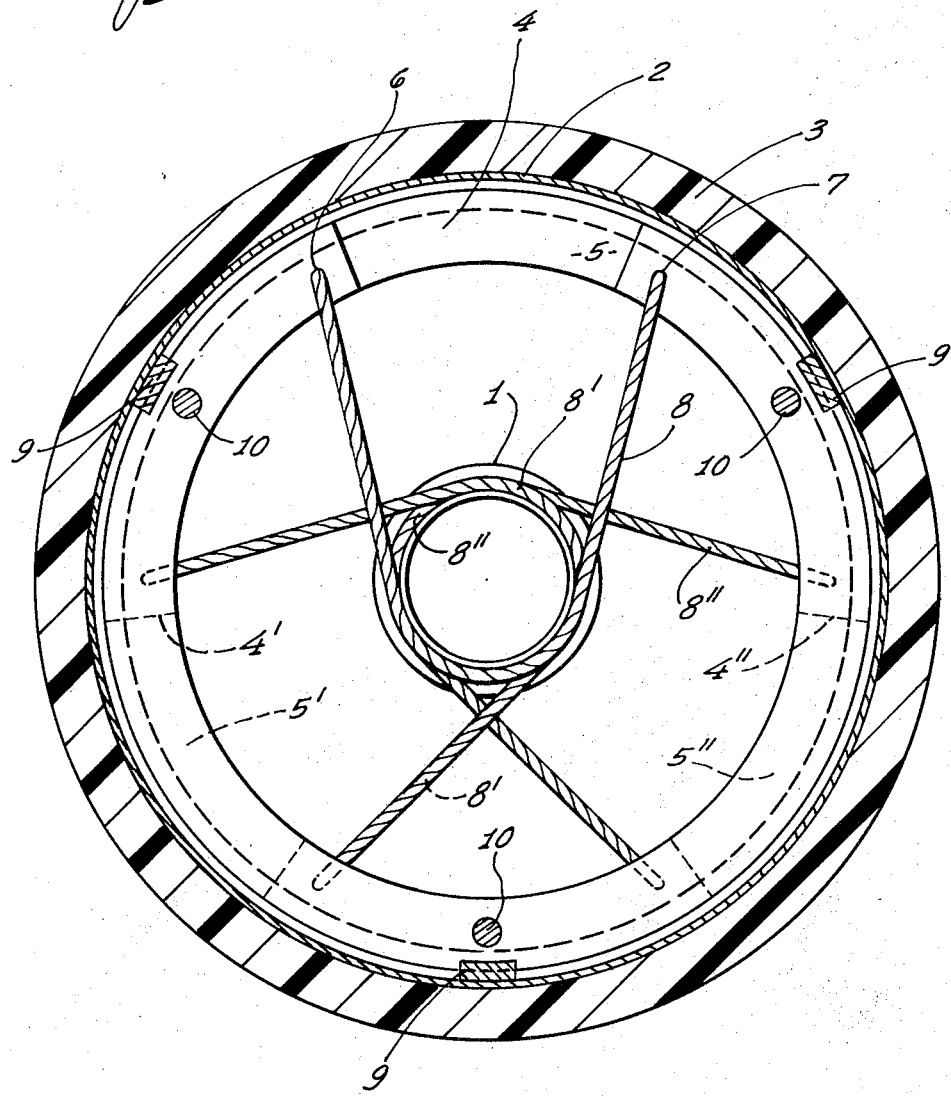
FIG. 1 shows an inner tube 1 of a coaxial tube system, in which an outer tube 2 has concentric position to the inner tube 1, having smaller diameter accordingly. It is assumed that the inner tube 1 serves as conduit for hot or cold fluid. That tube may consist of copper or stainless steel and is provided with annular corrugations.

The outer tube 2 may consist of the same material and is shown as being jacketed in a thermoplastic envelope 3. The space between the two tubes may be evacuated, if, for example, the inner tube is to conduct liquid helium at a temperature of about 4.2° Kelvin. Moreover, that space between the tubes may be filled partially or completely with super-isolation such as loosely laminated metal foils or metallized plastic foil with interposed layers of glass fiber fleece, mesh or the like.

The tube 1 may contain conductors for a cryogenic cable system for superconduction or low resistance conduction at low temperature. The resulting cable may be used as low impedance communication cable or low loss power cable.

Alternatively, tube 1 itself may contain a concentric tube, suspended therein or placed otherwise. The space between tubes 1 and 2 may then serve as flow space for a thermal isolation fluid. Or in case hot liquid or gas passes through tube 1, heating fluid may flow in the ring space between tubes 1 and 2.

In accordance with the teaching of this invention, tube 1 is suspended inside tube 2. At least two (presently three) rings or ring segments 4 are provided as suspension holders. One ring is shown in frontal elevation, the other two rings 4' and 4" are disposed behind (axially) the one that is visible. The rings may be made of metal or plastic.

Each ring has a gap such as 5, for the one ring 4 that is visible. Gaps 5' and 5" of the rings (4' and 4") are located behind the one ring 4 as depicted in dotted lines. Due to the angularly displaced disposition of the three ring elements as far as the gaps are concerned, the gaps do not align axially so that the resulting annular construction is of a closed-ring configuration.

Each of the gaps 5, 5', 5", has width slightly larger than the outer diameter of tube 1, measured a plane that passes through a corrugation crest. Points 6 and 7 denote locations in the ring segments adjacent the respective gap from which wire, ribbon or thread loops 8, 8' and 8" are suspended. The loops may be made from flexible plastic string or ribbon, metal wires, rope or the like.

In the illustrated position, tube 1 is shown as hanging in loop 8, while loops 8' and 8" together prevent lateral deflection of the tube 1. In case of an 60° axial rotation, the tube 1 would hang in two loops and the third one prevents lateral deflection in cooperation with each of the other loops.

As to each loop, the (radial) center line 1 of symmetry thereof defines a particular suspension point for tube 1 and these points are 120° apart. They remain thusly as far as suspending-loop-tube-tension interaction is concerned, for any angular position of the ring, disregarding presently the effect of gravity as due to the symmetric arrangement of loops, any two loops tension the tube against the third loop. In the illustrated position, tensioning of the loop 8 by symmetric pulling action of loops 8' and 8" is aided by gravity. If the rings are turned by 60°, the actual suspension points shift along the looping configuration, when gravity is considered. The overlapping loops make sure that the gravity never acts outside of any point of looping engagement and tension interaction between at least one loop and the inner tube.

Thus, the tube is properly suspended by operation of the three loops, no matter what the angular orientation relative to the axis of the common axis of tubes and rings is.

The outer tube 2 may likewise be corrugated and the ring assembly or unit 4–4'–4" reaches into a corrugation valley (as seen from the inside) and is maintained therein by axially extending struts 10, bars or the like.

As shown, the (radial) center lines of suspension of the three loops are spaced-apart by 120°, so are gaps 5, 5' and 5". Reference numeral 10 denotes bolts or the like that interconnect the coaxially dispositioned three-ring segments 4, 4' and 4", so that together they constitute a complete annulus of unitary configuration. Other such suspension units are placed along the axial extension of the tubes.

The inner tube 1 is actually suspended by and in these ring units such as 4–4' and –4". The outer tube can be formed on top and around that inner tube-plus-spacer configuration and in coaxial relation thereto.

FIG. 1 illustrates the completed assembly with a spacer unit, and inner and outer tubes. Moreover, the assembly as made is based on the assumption that three similar rings with gap have been slipped independently onto the inner tube, in concentric configuration to the inner tube, in coaxial alignment to each other, and with angular displacement of the gaps as defining the orientation of the tube-suspending loops. After having been placed in that position, the three rings are bolted together. The three bores in each ring are arranged in a corresponding pattern, i.e. 120° apart to permit, in fact, such relative placement of the rings for bolting them to each other in a 120° angular displacement, so that the loops are spaced in corresponding 120° angular displacement.

Figure 3:
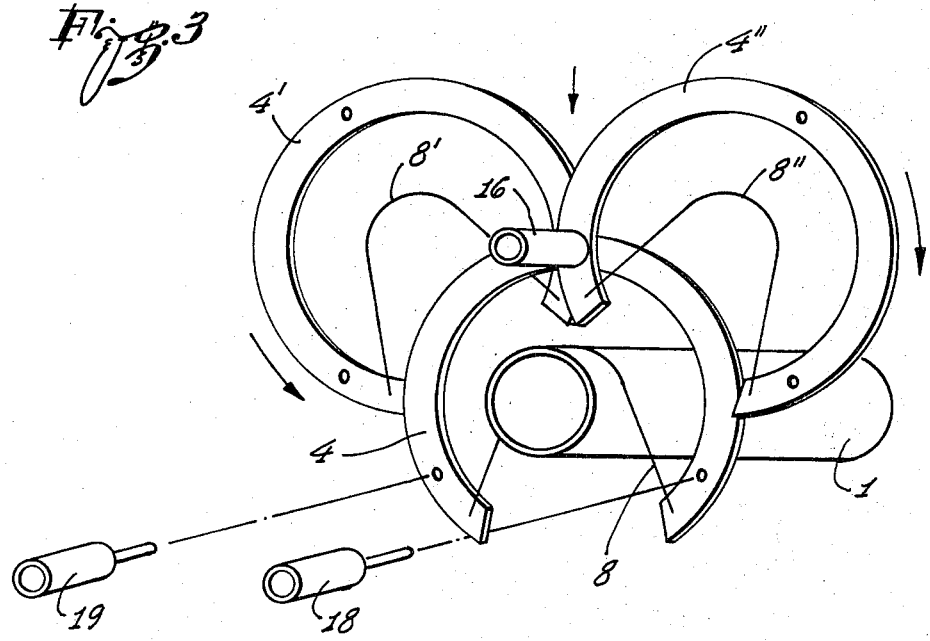
Figure 2:
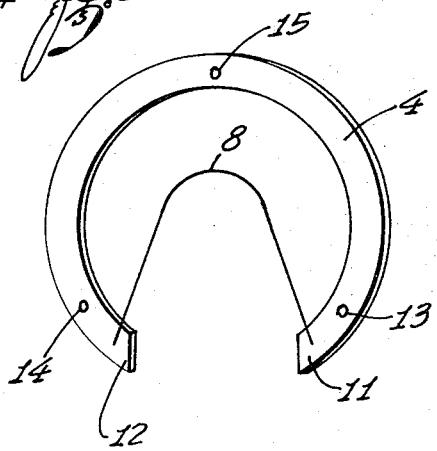
Figure 4:
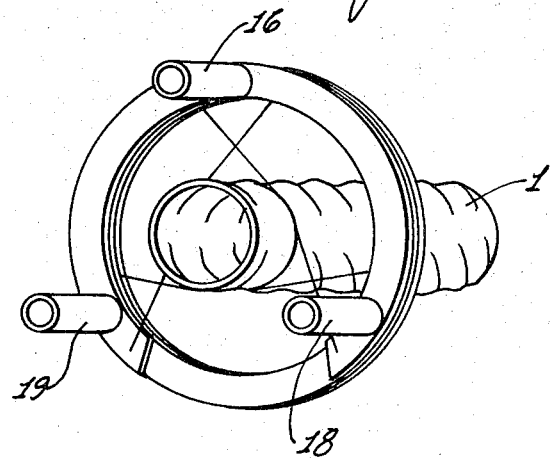

FIGS. 2, 3 and 4, illustrate how the configuration has been or can be arrived at in a different way, using the same ring elements, but providing them in particular preassembled, hinged configuration.

FIG. 2 illustrates an individual ring 4 with gap 5 and one can define two arms 11 and 12; bores 13 and 14 are provided in these arms, and there is a central bore 15 opposite gap 5. Bores 13, 14 and 15 are apart angularly in relation to the center of the ring by 120°. Loop 8 is shown in suspending position, which, of course, will be assumed by a flexible thread, ribbon or wire, when holding a tube (or when the ring 4 is turned by 180°) and when the tube is tensioned by upwardly directed forces (such as provided by other rings with suspending loops) tending to pull the tube up.

Three similarly constructed rings 4, 4' and 4'' can be initially hinged together, as shown in FIG. 3. A pin element 16 traverses bore 15 and provides a pivot axis. The bore in ring 4' corresponding to bore 13 in ring 4, and the bore in ring 4'' corresponding to bore 14 in ring 4 serve as pivot and hinge points respectively for rings 4' and 4''. This way, the two rings 4' and 4'' are hinged to ring 4 to establish a pre-assembled spacer unit.

Upon assembling that unit in relation to and on tube 1, ring 4 is slipped into concentrical position to tube 1, gap 5 being sufficiently wide. The two rings 4' and 4'' are folded away as shown in FIG. 3. Next, the two rings 4' and 4'' are pivoted on the common hinge axis (but in opposite directions) and into position defined by axial alignment of the rings, in a coaxial relation.

It can be seen that the hinge bores 13 and 14 must be sufficiently far from the end of the respective arm, 11 and 12, so that the tube will pass through gaps 5' and 5'', the gaps must be sufficiently wide accordingly. It can now be seen why the bores 13–14–15 must be 120° apart. The several bores in the several ring register, when they are all aligned even though the gaps are angularly displaced in coaxial position. Additional bolts 18 and 19 are now used to tighten the three rings together so as to form a unitary structure.

It should be noted that tube 1 is illustrated as uncorrugated tube just for purposes of simplifying illustration. Corrugated tubing is generally preferred for most areas of employment of concentric tube systems. Presently, the corrugation grooves are additionally beneficial here, as they aid in defining definite axial position of the suspending loops and prevent axial displacement of the spacer unit when assembled, providing the loops are sufficiently taut.

FIG. 5 illustrates a somewhat simplified version of the invention. There is shown a single ring 20 which actually could be similar to ring 4. The gap 21 is also sufficiently wide to permit passage of the tube 1. Now, this single ring has two threads 24 and 25, each forming rather shallow loops which do not overlap. Thread, ribbon or wire 24 has one end fastened to the end of arm 22 of ring 20, the other end is fastened about diametrically across. Thread etc. 25 is symmetrically disposed thereto, being fastened with one end to arm 23 of ring 20, the other end of the thread is fastened to a point on ring 20, also opposite to the gap. A ring segment 27 is pivoted or hinged with one end, for example, to arm 23, pin 29 establishing the pivot and hinge. Ring segment 27 may pivot so that its other end 30 can be brought into axial alignment with arm 22, thus closing, in fact, the gap to establish a gapless ring configuration. Segment 27 has its own thread or wire 31, loosely extended between its ends and establishing the third shallow suspending loop for the tube 1.

The completed assembly is depicted in FIG. 6, showing inserted additional bolts 32 and 33. These bolts may be sufficiently wide, so that they are axially flush with the periperhy of the completed ring structure. Thus, the assembly can just be seated inside of the outer tube, for example, to be formed on the inner tube-spacer assembly.

Turning now to the description of FIG. 7, a ring 36 with suspending loop 41 and gap 35 is illustrated here, corresponding in that respect to the rings-with-gap shown in the preceding examples. The tube to be suspended is shown as smooth wall tube 34. Two ring segments 37 and 38 are respectively hinged at points 39 and 40. Threads, ribbons or wires, 42 and 43, are used here in a somewhat modified arrangement. One end of each thread or wire 42, 43, is affixed to the ring 36 rather opposite to gap 35 (but not diametrical to the gap center, though that is possible). The other end of thread or wire 42 connects to free end 45 of segment 38, while the other end of thread or wire 43 connects to the free end 44 of segment 37.

Upon pivoting segments 37 and 38 in opposite directions (curved arrows) so as to bring them into axial alignment with ring 36, wires etc. 42 and 43 flex, and loops are formed around tube 34 for suspending and holding it as desired. That, of course, is preceded by placing ring 36 in concentric position to tube 34 (down arrow). Bolts 46 and 47 secure the "free" ends 45 and 44 respectively of the segments to ring 36. The bolt 48 opposite the center of gap 35, as well as bolts 46 and 47 serve for positioning (and for stabilizing the position of) the ring assembly in the outer tube.

In each of these embodiments multiple incomplete ring elements, either rings with gap or ging segments, are interconnected through hinges so that a folded-open state can be established for an initial placement on a tube. Upon folding-closed and bolting an annular spacer unit is produced, which, on one hand, is a self-supporting element and which, on the other hand, suspends a tube concentrically by operation of multiple looping threads, ribbons or wires, providing, for example, a three-point suspension of the tube in the annulus. The threads, ribbons or wires should be placed so that in the folded-open position little or no strain is exerted upon the wires or threads, while in the closed position, each two loops act on the inner tube to tension the third loop.

The invention is not limited to the embodiments described above but all changes and modifications thereof not constituting departures from the spirit and scope of the invention are intended to be included.

We claim:

1. In a concentric tube system having at least two tubes, to be placed in thermally insulative, concentric relation, and held in that relation by spacer assemblies, the improvement in such a spacer assembly comprising:

an annular arrangement traversed by the inner one of the two tubes and disposed on the inside wall of the outer one of the two tubes the annular arrangement being constructed from plural ring elements hinged to each other, each having a gap permitting passage of the inner tubes upon lateral placement of the ring elements into concentric position to the inner tube; and a plurality of loops extending inwardly from the annular arrangement and having dimensions for suspending the inner tube in the annular arrangement under tension and from at least three different radial directions, the loops being established by flexible elements such as thread, wire or ribbon.

2. In a system as in claim 1, wherein the annular system is comprised of a ring with a gap and at least one ring segment being hinged to the ring so as to close the gap.

3. In a system as in claim 2, wherein one segment is hinged to the ring, a first thread or wire extending between the ends of the segment, two additional threads or wires extending from the ring portions adjacent the gap to locations opposite the gap.

4. In a system as in claim 2, wherein two ring segments are hinged to the one ring respectively with one end of each segment and in opposite positions in relation to the gap in the ring; first and second flexible ribbons extending respectively from the other ends of the segments to points on the ring opposite the gap, a third flexible element forming a loop from points on the ring adjacent the gap.

5. In a tube system as in claim 1, wherein the annular system is constructed from ring elements which include at least one ring with a gap and one or more rings with gaps or one or more ring segments, being hinged to the one ring.

6. In a tube system as in claim 5, wherein the plural rings with gaps are hinged on a common hinge axis, but at different points in relation to the respective gaps, so that upon concentric placement of one ring to the inner tube, the other rings can be pivoted into similarly concentric position, the respective gaps clearing the inner tube.

7. In a tube system as in claim 5, the rings and/or ring segments being fastened to each other in the annular assembly.

8. In a tube system as in claim 5, the loops resulting from fasting wires, ribbon or threads to points of the rings adjacent the respective gaps.

9. In a tube system as in claim 1, wherein the inner tube is corrugated, each loop lying in a corrugation groove.

10. In a tube system as in claim 1, the annular assembly comprised of plural ring elements with gaps at least as wide as the diameter of the inner tube, the elements secured to each other in concentric position, the loops being suspended from the rings, and being distributed around the inner tube in overlapping configuration of engagement with the inner tube.

11. In a tube system as in claim 1, and including axially extending support means at the periphery of the annular assembly for supporting the assembly on the inner wall of the outer tube.

12. In a concentric tube system having at least two tubes, to be placed in thermally insulative, concentric relation, and held in that relation by spacer assemblies, the improvement in such a spacer assembly comprising:

an annular arrangement traversed by the inner one of the two tubes and disposed on the inside wall of the outer one of the two tubes, the annular arrangement being constructed from plural ring elements each having a gap permitting passage of the inner tube upon lateral placement of the ring elements into concentric position to the inner tube, the ring elements being disconnectible from each other at least to the extent for permitting each element to be placed into the concentric position of the tube;

means for securing the ring elements in relation to each other in the concentric position; and a plurality of loops extending inwardly from the annular arrangement and having dimensions for suspending the inner tube in the annular arrangement under tension and from at least three different radial directions, the loops being established by flexible elements such as thread, wire or ribbon.

13. In a tube system as in claim 12, wherein the rings are similar in construction, and the gaps are displaced by 120° to each other, the loops extending respectively from the ring ends at the respective gaps.

* * * * *